United States Patent

[11] 3,533,442

[72] Inventors Gerhardt Lange;
 Heinz Gabel, Frankfurt am Main, Germany
[21] Appl. No. 778,266
[22] Filed Nov. 22, 1968
[45] Patented Oct. 13, 1970
[73] Assignee Messer Griesheim GmbH
 Frankfurt am Main, Germany
 a corporation of Germany
[32] Priority Nov. 25, 1967
[33] Germany
[31] 1,627,569

[54] INITIATION DEVICE FOR AUTOGENOUS FLAME CUTTING MACHINES
 7 Claims, 1 Drawing Fig.
[52] U.S. Cl. ................................................... 137/624.18,
 266/23, 148/9
[51] Int. Cl. ...................................................... B23k 7/00
[50] Field of Search ........................................... 137/624.11,
 624.18, 606, 607, 597; 266/23(A); 198/9

[56] References Cited
 UNITED STATES PATENTS
 2,210,403 8/1940 Skinner ........................ 148/9
 2,288,026 6/1942 Rea ............................. 266/23X Primary Examiner—Alan Cohan
Attorney—Connolly and Hutz ABSTRACT: An autogenous flame cutting machine includes separate cutting and heating oxygen supply lines which are connected by a branch line having a flow regulating valve therein. A valve is also provided in the cutting oxygen supply line downstream from the connecting point of the cutting oxygen supply line and the branch line. The latter valve is adjustable by a throttle device in the cutting oxygen line downstream from the valve.

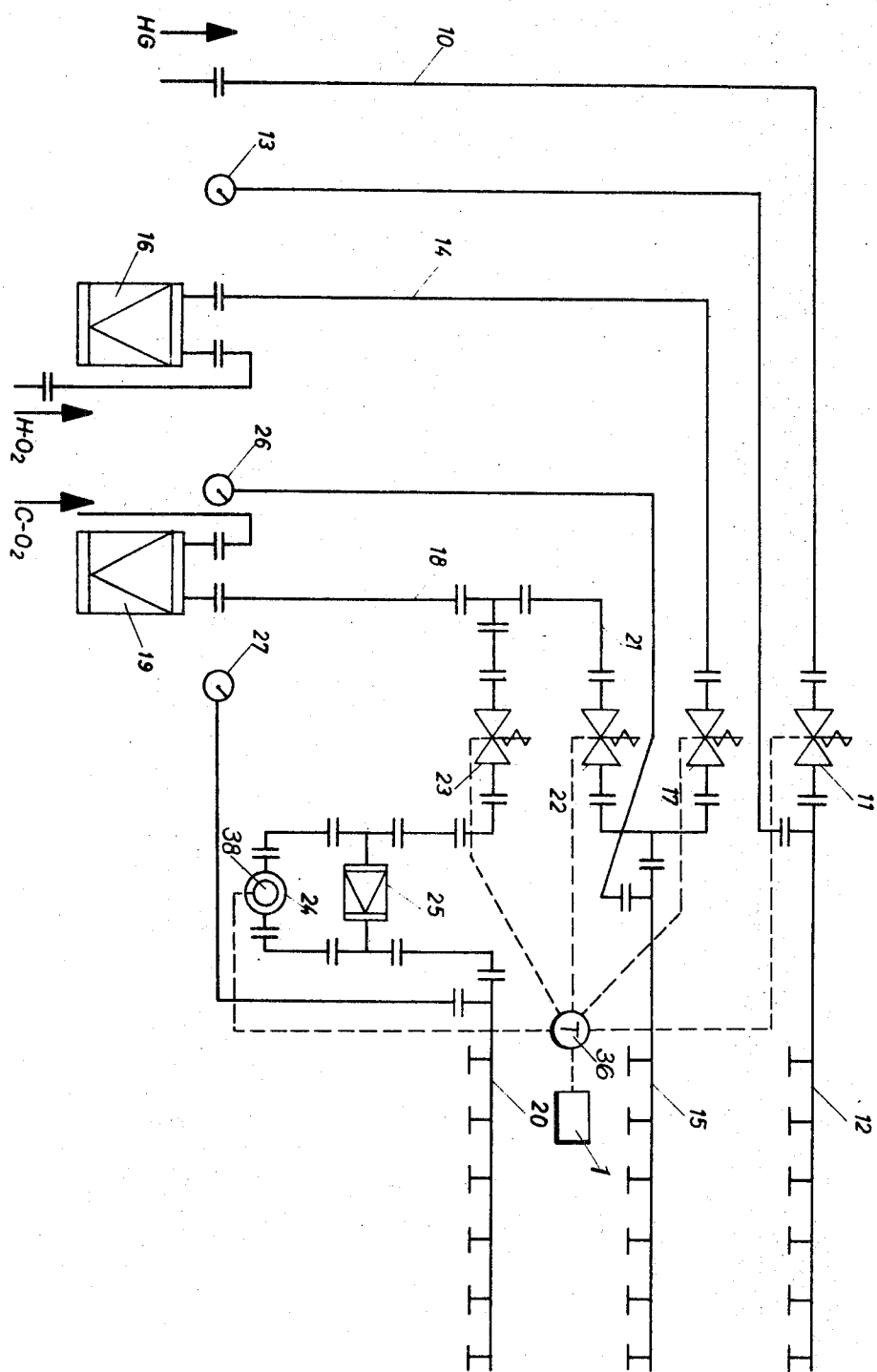

INITIATION DEVICE FOR AUTOGENOUS FLAME CUTTING MACHINES

BACKGROUND OF INVENTION

The invention relates to a device for the initiation of a cutting process, particularly one originating from the workpiece surface, with respect to autogenous flame cutting machines having separate heating and cutting oxygen supply to the torch.

It is known that in hole cutting with a stationary torch, a pear-shaped perforation results. The thicker the material, the larger the pear becomes and much more slag comes up through the relatively narrow neck at a high rate of speed. In this connection, the slag in part hits the torch nozzle and thereby detrimentally affects its functioning. For the avoidance of this disadvantage, it has already been recommended to move the torch in the direction upon the contour of the structural part to be cut out and simultaneously slowly to build up the cutting oxygen pressure. Thus, the amount of cutting oxygen supplied corresponds approximately to the material to be burned, referring to the penetration depth of the cutting jet as the case may be.

During the torch cutting process, as a rule a relatively weak heating flame is needed, so that the upper edge of the structural part is not melted off during the torch cut. By means of such a normally adjusted heating flame, however, the material can only slowly be heated up to combustion temperature. There exist devices, therefore, which serve for the changing over of the heating flame. Thus, for example, before the start of the torch cut, a strong heating flame can be adjusted in order to heat the material to combustion temperature in less than 1 minute and in the turning on of the cutting oxygen and the machine movement, the heating of the torch can simultaneously be standardized by means of existing pressure reducers and magnetic valves.

Each cutting nozzle is constructed in such a manner that with sufficient cutting oxygen pressure a very focused cutting jet is emitted. At extremely low cutting oxygen pressure, e.g. 0.01 atmospheres absolute (excess) pressure, the cutting oxygen jet is not long and focused, but instead is already very divided shortly and immediately before the nozzle.

As already described, it has previously been customary to slowly increase the cutting oxygen pressure in hole cutting. In this connection, it is unavoidable, however, that the cutting jet at the very beginning hits unfocused the material heated to combustion temperature and burns completely unaimed and to a large extent at random. Accordingly, during the cutting there first results an uncontrollably wide, and then a narrower becoming cutting seam; the slag resulting during the hole cutting step being emitted upwards behind the torch opposite the cutting direction. Experiments have shown that particularly the beginning of the cutting seam is of importance for the guidance of the issuing slag. If whirls occurs, reactions set in which affect the entire process.

SUMMARY OF INVENTION

The object of the invention is to avoid the above disadvantages in the initiation of the torch cutting process from the workpiece surface, i.e. the narrowest possible cutting seam is made at the beginning of the so-called hole cutting process.

Another object of the invention is to allow as little as possible of the slag to come up, i.e. to penetrate the material with as little cutting oxygen as possible.

According to the invention, a device of the initially described type is characterized by a connecting pipe or branch line provided with a valve, between the heating and the cutting oxygen supply line; furthermore, in that a valve in the cutting oxygen supply line. As seen in the direction of the jet of the cutting oxygen is arranged, behind the branching point of the connecting pipe a valve having an adjustable throttle means in the cutting oxygen supply line.

By means of the invention it is now possible to produce without great effort an intensive heating flame for a quick heating-up process; particularly by means of the cutting oxygen which is under relatively high pressure. After completion of the advantageously quick heating-up process, all that is required is a simple opening of the heating oxygen valve and of the valve in the cutting oxygen supply line as well as a closing of the valve in the connecting pipe, in order to achieve a standardization of the heating flame for the following cutting process. The known expendable regulating valves for the heating oxygen pressure as well as the protracted regulating process itself can be eliminated.

With the above-described changeover process, cutting oxygen is simultaneously made available at the torch nozzles, so that the cutting process can begin immediately. However, by means of the inventively adjustable throttling means in the cutting oxygen supply line, the entire cutting oxygen pressure is not immediately present at the nozzle. The throttling means are furthermore so complicated that they guarantee only a gradual buildup of the cutting oxygen pressure occurring at the torch nozzle to its full extent. For the buildup time for the cutting oxygen pressure, about 2 seconds are provided. The cutting oxygen pressure existing immediately at the beginning should be relatively low; however, the cutting oxygen jet should be already focused.

The initially described disadvantageous appearance of a pear-shaped cutout is avoided by the already focused cutting oxygen jet suddenly occurring at the nozzle after the above changeover process. By means of the relatively low starting pressure of the cutting oxygen jet, the slag amount collected is furthermore reduced to a minimum.

After the piercing, the cutting oxygen pressure can then reach its complete extent. Experiments have shown that, for example, at 130 mm.-thick material, the piercing through already occurs after 28 mm. Preheating and hole punching take about 20 seconds. The resulting cutting seam is first hardly wider than after the cutting through. The possibility stands out of plunge-cutting already on the contour of the structural part under consideration of the cutting seam width.

The above-described changeover process, at the end of the heating-up time, can basically be done by hand, wherein the duration of the heating-up time up to ignitability of the workpiece depends on the operator and in a particular case can be adjusted to the particular material type and thickness. According to the invention, however, an embodiment is preferred—especially in quantity production—which is characterized by an adjustable timer or timeclock for the automatic closing of the valve in the connecting pipe for the simultaneous opening of the heating oxygen valve and for the simultaneous opening of the valve in the cutting oxygen supply line.

With a once-adjusted timeclock, the work of the operator is reduced to a simple switching on of the machine, so that now a constant cutting quality, especially in the critical plunge-cutting area, is afforded independent of the expert quality of the operator.

A particularly advantageous switching over of the valves by means of the timeclock is achieved in that the valves in the connecting pipe, in the heating oxygen supply line as well in the cutting oxygen supply line are magnetic valves, as the case may be.

For the formation of the throttling means for the gradual building up of the cutting oxygen pressure after the changeover process, in the advantageous further development of the invention the adjustable throttling means includes a pressure reducer and a preferably motor-driven ball valve in the cutting oxygen supply line, and furthermore that the pressure reducer and the ball valve are switched parallel to each other.

The cutting oxygen in this connection passes, with at first a still closed ball valve, through the pressure reducer, which is designed for minimum pressure. Simultaneous with the above changeover process, however, suitably the motor for the ball valve also is switched on, so that it opens slowly and the cutting oxygen now increasingly passes through the ball valve until the eventual oxygen pressure has built up. Of course, according to the invention it is preferred that the motor for opening the ball valve is switchable on by the timeclock. Furthermore, it is suitable in the idea of an automation of the cutting process if the timeclock simultaneously serves for the switching on of the machine advance.

THE DRAWING

In the drawing and in the following description, the invention is explained in more detail by way of an exemplified embodiment. The drawing shows in schematic form the conduit system of a torch cutting machine.

DETAILED DESCRIPTION

A heating gas conduit 10 can be closed off by a magnetic valve 11 from the torch contacts 12 and a pressure indicator 13. The pertinent heating oxygen conduit 14 terminates in torch contacts 15. A pressure reducer 16 serves for the adjustment of the heating oxygen pressure. By means of a magnetic valve 17, the heating oxygen is switched on or off.

For the cutting oxygen there is accordingly provided a supply line 18 and a pressure reducer 19. Cutting oxygen is supplied to the torch contacts 20 through supply line 18. From the cutting oxygen supply line 18, a conduit 21 branches off which connects the cutting oxygen supply line 18 with the heating oxygen supply line 14. The cutting oxygen pressure occurs accordingly both at a magnetic valve 22 in the connecting pipe 21 as well as at a magnetic valve 23 which is downstream in the cutting oxygen supply line 18. In the cutting oxygen supply line 18—viewed in the current direction of the cutting oxygen—furthermore there is arranged a ball valve 24 as well as—parallel to it—a pressure reducer 25. The heating or cutting oxygen pressure is measurable by a pressure indicator 26 or 27.

The initiation of the cutting process occurs in the following manner:

First the heating or the cutting oxygen pressure is adjusted at the pressure reducers 16 and 19. The cutting oxygen pressure should be about 50 percent higher than the heating oxygen pressure. Fuel gas valve 11 and magnetic valve 22 are opened and the gases at the torch ignited. There results an intensified heating flame, since an intensified heating oxygen pressure (cutting oxygen) is present. Magnetic valves 11 and 22 switch on timer 36, which upon expiration of a present time period closes magnetic valve 22 and opens magnetic valve 17. Thereby the heating is standardized, since the heating oxygen abuts the torch with a pressure, such as was adjusted at the pressure reducer 16. The timer 36 furthermore switches magnetic valve 23 and the driving motor 38 of the ball valve 24, as well as the machine advance 1. With opening of the magnetic valve 23, there suddenly remains at the torch connections 20 cutting oxygen with a low pressure as adjusted at the pressure reducer 25. At this pressure, the cutting jet is already focused and there results a narrow cutting seam which penetrates increasingly deeper into the material. Once a cutting seam of 2 to about 5 mm. length has resulted, the ball valve 24 opens, and the cutting oxygen pressure rises within 2 seconds at the torch up to the table value set at the pressure reducer 18.

We claim:

1. An initiation device in an autogenous flame cutting machine having separate cutting oxygen and heating oxygen supply lines, a branch line connecting said supply lines, a branch valve in said branch line, a cutting oxygen valve in said cutting oxygen supply line downstream from the connecting point between said branch line and said cutting oxygen supply line, and throttle means in said cutting oxygen supply line downstream from said cutting oxygen valve for adjusting the flow of cutting oxygen through said cutting oxygen valve.

2. A device as set forth in claim 1 including a heating oxygen valve in said heating oxygen supply, and timing means for simultaneously closing said branch valve and opening said heating oxygen and cutting oxygen valves.

3. A device as set forth in claim 2 wherein all of said valves are magnetic valves.

4. A device as set forth in claim 3 wherein said throttle means includes a pressure reducer in said cutting oxygen supply line, and a motor-driven ball valve connected parallel to said pressure reducer.

5. A device as set forth in claim 4 wherein said timing means controls the switching on of said motor.

6. A device as set forth in claim 5 including machine advance means, and said timing means simultaneously controlling the switching on of said machine advance means.

7. A device as set forth in claim 1 wherein said throttle means includes a pressure reducer in said cutting oxygen supply line, and a motor-driven ball valve connected parallel to said pressure reducer.